United States Patent
Shin et al.

(10) Patent No.: US 9,609,623 B2
(45) Date of Patent: Mar. 28, 2017

(54) APPARATUS AND METHOD FOR RECEIVING PAGING IN MOBILE COMMUNICATION SYSTEM

(71) Applicant: Samsung Electronics Co., Ltd., Suwon-si, Gyeonggi-do (KR)

(72) Inventors: Jong-Keol Shin, Yongin-si (KR); Jong-Han Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 68 days.

(21) Appl. No.: 14/204,099

(22) Filed: Mar. 11, 2014

(65) Prior Publication Data

US 2014/0254553 A1   Sep. 11, 2014

(30) Foreign Application Priority Data

Mar. 11, 2013  (KR) .................. 10-2013-0025570

(51) Int. Cl.
*H04W 36/04* (2009.01)
*H04W 68/02* (2009.01)
*H04W 48/20* (2009.01)
*H04W 60/00* (2009.01)

(52) U.S. Cl.
CPC ........... *H04W 68/02* (2013.01); *H04W 48/20* (2013.01); *H04W 60/00* (2013.01)

(58) Field of Classification Search
CPC ..... H04W 68/02; H04W 48/20; H04W 36/04; H04W 60/00
See application file for complete search history.

(56) References Cited

U.S. PATENT DOCUMENTS

| | | | |
|---|---|---|---|
| 6,282,178 | B1 | 8/2001 | Noerpel et al. |
| 2010/0144352 | A1 | 6/2010 | Narang et al. |
| 2010/0297999 | A1 | 11/2010 | Iwamura et al. |
| 2011/0009130 | A1 | 1/2011 | Wu |
| 2011/0096706 | A1 | 4/2011 | Ramasamy et al. |
| 2012/0120789 | A1 | 5/2012 | Ramachandran et al. |
| 2012/0302241 | A1 | 11/2012 | Klingenbrunn et al. |
| 2013/0010663 | A1* | 1/2013 | Chin ................ H04W 36/0072 370/311 |
| 2013/0260810 | A1* | 10/2013 | Rayavarapu ........ H04W 76/028 455/509 |

FOREIGN PATENT DOCUMENTS

| | | |
|---|---|---|
| EP | 2 187 681 A1 | 5/2010 |
| WO | 2012-124894 A1 | 9/2012 |
| WO | 2013/023120 A1 | 2/2013 |

* cited by examiner

*Primary Examiner* — Gbemileke J Onamuti
(74) *Attorney, Agent, or Firm* — Jefferson IP Law, LLP

(57) ABSTRACT

A method operating a user equipment for avoiding paging missing in a mobile communication system is provided. The method of operating a user equipment includes performing an area update process caused by a registration area change, performing a reselection of a previous registration area after performing the area update process, and attempting to receive a paging in the previous registration area.

22 Claims, 14 Drawing Sheets

APPARATUS AND METHOD FOR RECEIVING PAGING IN MOBILE COMMUNICATION SYSTEM

CROSS-REFERENCE TO RELATED APPLICATION(S)

This application claims the benefit under 35 U.S.C. §119(a) of a Korean patent application filed on Mar. 11, 2013 in the Korean Intellectual Property Office and assigned Serial No. 10-2013-0025570, the entire disclosure of which is hereby incorporated by reference.

TECHNICAL FIELD

The present disclosure relates to a paging reception in a mobile communication system.

BACKGROUND

In a mobile communication system, a User Equipment (UE) can perform an inter-cell movement, and a system should determine an approximate location of the UE so as to perform a paging corresponding to the UE. If the UE is activated, since the UE performs a handover during the inter-cell movement of the UE, the system may determine the location of the UE. However, if the UE is in an idle mode, then the UE moves without a handover. Therefore, in this case, the UE performs a Location Area Update (LAU) or a Tracking Area Update (TAU) in order to register the location of the UE to the system. Accordingly, the system can perform the paging corresponding to the UE via Base Stations (BSs) belonging to a Location Area (LA) or Tracking Area (TA) to which the UE is registered.

However, if the paging is performed while the UE performs the LAU or TAU process, then a paging message may be transmitted in cells belonging to a previous LA or a previous TA. In this case, the paging message may be missed. That is, when an LA Identifier (LAI) or a TA Identifier (TAI) is changed due to a UE movement, and thus, the LAU or the TAU must be performed, then a paging transmission may start in a cell, to which the previous LAI/TAI belongs, during the LAU/TAU. As a result, there may be a case where the paging may not be delivered to a UE which moves to a cell to which a new LAI/TAI belongs. A situation of missing the paging message will be described below in greater detail.

When the LAI/TAI is changed and, thus the LAU/TAU is performed, then the paging transmission may start in a cell to which the previous LAI/TAI belongs during the LAU/TAU process. In preparation for this case, by using an inter-system paging or a roaming retry, a function of delivering the paging to an LAI/TAI to which a current cell belongs, after the completion of the LAU/TAU is implemented in a BS. However, due to several situations and/or features of the BS, such as a timer, etc., missing of the paging is frequently observed in practice in an LAI/TAI boundary area.

In addition, if the UE supports a multi-mode capable of providing accessing to different types of Radio Access Technologies (RATs), then the paging may be missed during an inter-network reselection process. For example, in case of moving between a $3^{rd}$ Generation (3G) network and a $4^{th}$ Generation (4G) network, if the paging starts to be delivered using a previous RAT, i.e., a 3G RAT, during an RAT change process, the paging proceeds through the 3G network. As a result, all subsequent paging may be missed, which leads to a reception failure in a case of voice telephony. More specifically, the paging that is missed during the RAT change process is illustrated in FIG. 1 and FIG. 2 to be described below.

FIG. 1 illustrates a signal exchange for an RAT change in a mobile communication system according to the related art.

Referring to FIG. 1, a UE 120 has a first communication module 121 and a second communication module 122. The first communication module 121 provides an interface for a first RAT, and the second communication module 122 provides an interface for a second RAT. For example, the first RAT may be a Long Term Evolution (LTE) network, and the second RAT may be a Universal Mobile Telecommunications System (UMTS). In order to move to the first RAT while the UE 120 is in a state of initially accessing the second RAT, the second communication module 122 transmits a measure request to the first communication module 121 in operation 101, and the first communication module 121 transmits a measure report including a measurement result to the first communication module 121 in operation 103. In operation 105, the second communication module 122 transmits a reselection request to the first communication module 121. The first communication module 121 transmits a reselection confirm in operation 107, and transmits a TAU request to a BS 110 in operation 109. In operation 111, a Base Station (BS) 110 of the first RAT performs the TAU process, and thereafter transmits a TAU accept. During the aforementioned process, a paging delivered through the second RAT may be missed between a time of delivering the reselection request in 105 and a time of delivering the TAU accept in operation 111.

FIG. 2 illustrates an example of paging missing during an RAT change process in a mobile communication system according to the related art.

Referring to FIG. 2, a signal exchange between a first communication module 221 and a second communication module 222, and a Paging Frame (PF) in a second RAT, are illustrated in FIG. 2. As illustrated in FIG. 2, after the occurrence of a PF P0, a measure report, or the like, is complete, and thereafter if a reselection condition is satisfied, a network reselection starts. In this case, the reselection starts if a related timer expires and if a candidate cell of the first RAT is included in a ranked list. Thereafter, the first communication module 221 transmits a TAU request to the first RAT, and receives a TAU accept/reject. From a start time of the reselection up to a reception time of the TAU accept/reject, only the first communication module 221 engages a Radio Frequency (RF) module in order to perform the TAU process, and, even if there are a plurality of RF modules, the second communication module 222 may be in an inactive state due to a decrease in a power consumption amount or the like. Therefore, in general, if a paging starts by using the second RAT, which is a previous RAT, during the TAU process, then a UE may not receive the paging after reselecting the first RAT. That is, a paging missing interval 230 occurs, and a paging message is missed in the second RAT through frames P1 and P2.

As described above, due to the LAU/TAU process after the UE movement or the RAT change, the paging message delivered through a previous cell or a previous RAT may be missed. Therefore, there is a need for a method for decreasing a probability of missing the paging message.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for avoiding paging missing in a mobile communication system.

Another aspect of the present disclosure is to provide an apparatus and method for confirming whether a paging is performed in a previous cell after a Location Area Update (LAU) or Tracking Area Update (TAU) process in a mobile communication system.

Another aspect of the present disclosure is to provide an apparatus and method for confirming whether a paging is performed in a previous Radio Access Technology (RAT) after an RAT change process in a mobile communication system.

Another aspect of the present disclosure is to provide an apparatus and method for confirming whether a paging is performed in a previous RAT during an RAT change process in a mobile communication system.

In accordance with an aspect of the present disclosure, a method of operating a User Equipment (UE) in a mobile communication system is provided. The method includes performing an area update process caused by a registration area change, performing a reselection of a previous registration area after performing the area update process, and attempting to receive a paging in the previous registration area.

In accordance with another aspect of the present disclosure, a method of operating a UE in a mobile communication system is provided. The method includes performing a measurement in order to perform a RAT change process to change a RAT from a second RAT to a first RAT, stopping the RAT change process after performing the measurement, attempting to receive a paging in the second RAT, and resuming the RAT change process.

In accordance with another aspect of the present disclosure, a UE apparatus in a mobile communication system is provided. The UE apparatus includes a controller configured to perform an area update process caused by a registration area change and configured to perform a reselection of a previous registration area after performing the area update process, and at least one communication module configured to attempt to receive a paging in the previous registration area.

In accordance with another aspect of the present disclosure, a UE apparatus in a mobile communication system is provided. The UE apparatus includes a controller configured to perform a measurement in order to perform a Radio Access Technology (RAT) change process to change a RAT from a second RAT to a first RAT and for stopping the RAT change process, and at least one communication module configured to attempt to receive a paging in the second RAT, wherein the controller is configured to resume the RAT change process after attempting the paging reception.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
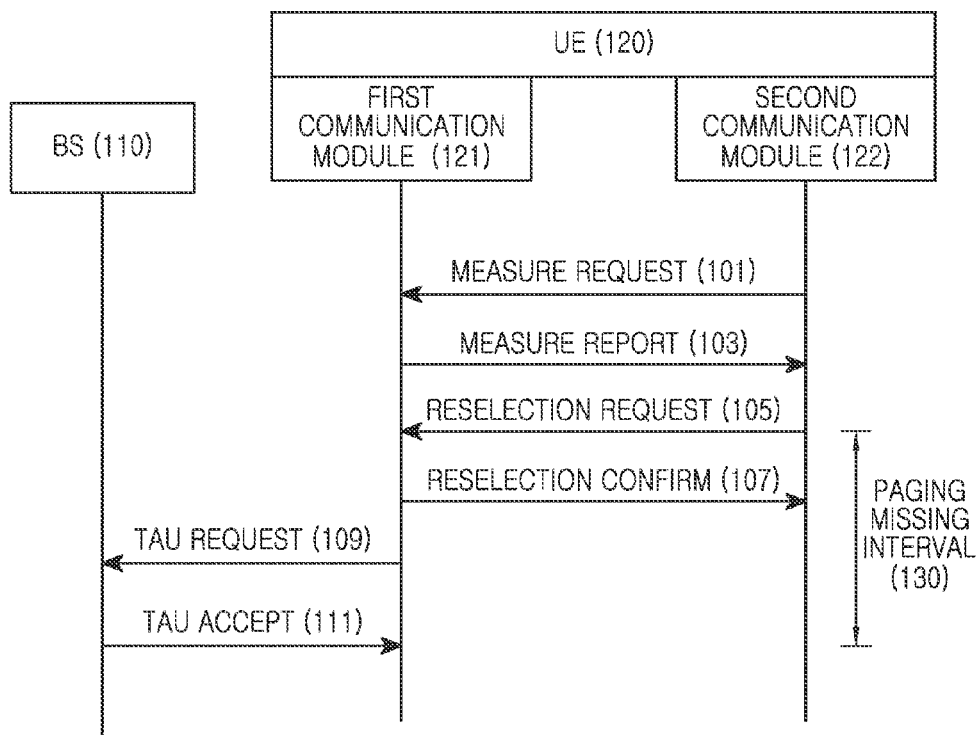
FIG. 1 illustrates a signal exchange for a Radio Access Technology (RAT) change in a mobile communication system according to the related art.
Figure 2:
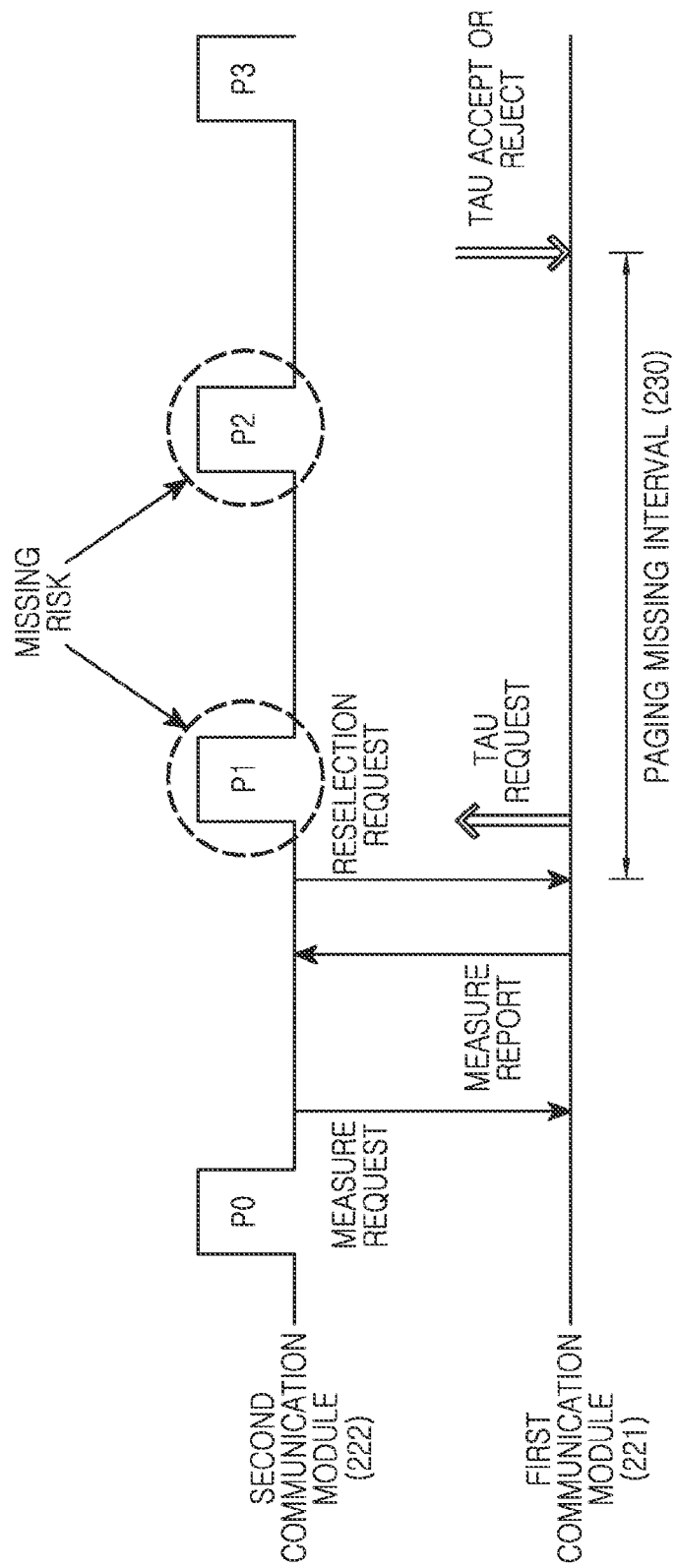
FIG. 2 illustrates an example of paging missing during an RAT change process in a mobile communication system according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and changes of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure relates to a technique for decreasing a paging missing probability due to a Location Area Update (LAU) and/or Tracking Area Update (TAU) process after a User Equipment (UE) movement or a Radio Access Technology (RAT) change in a mobile communication system.

For convenience of explanations, the present disclosure uses terminologies and names defined in a $3^{rd}$ Generation Partnership Project (3GPP) standard. However, the present disclosure is not limited to these terminologies and names, and is also applicable to a system conforming to another standard.

A multi-mode UE supporting multiple RATs is considered in the present disclosure. The RATs supported by the UE may include two or more of a Long Term Revolution (LTE) RAT, a $2^{nd}$ Generation (2G) RAT, a $3^{rd}$ Generation (3G) RAT, a Code Division Multiple Access (CDMA) RAT, or any other similar and/or suitable type of RAT. However, the following paging reception method based on the UE movement is also applicable to a UE supporting only one RAT.

Cells of a mobile communication system are divided into Tracking Areas (TAs), and the UE has its TA list. When the UE enters a TA having a TA Identifier (TAI) that is not included in the TA list, then the UE should perform a TAU process. The TA is a term of an LTE standard, and in a case of a 3G standard, may be referred to as a Routing Area (RA) or a Location Area (LA). For convenience of explanations, the term 'TA' is used hereinafter in the present disclosure.

If the UE is requested to perform the TAU on the basis of a movement, then the UE, according to an embodiment of the present disclosure, confirms whether a paging is delivered through a previous cell after the completion of the TAU and then the UE handles the paging upon receiving the paging. In addition, the UE, according to the embodiment of the present disclosure, changes an RAT, confirms whether a paging is delivered through a previous RAT after the completion of the TAU or during the TAU process, and upon receiving the paging, handles the paging. Accordingly, a probability of a paging reception failure which may occur either in a TA boundary area or during an inter-RAT process may be decreased. A case where a TA is changed due to a UE movement will be described below.

In a cell reselection accompanied by a TAU, a previous cell and a current cell may be scheduled together so that a UE can receive a paging which may be missed when delivered through a previous TAI. If the cell reselection is performed from one LTE cell to another LTE cell, then the cell reselection may be called an LTE to LTE (L2L) reselection.

Figure 3:
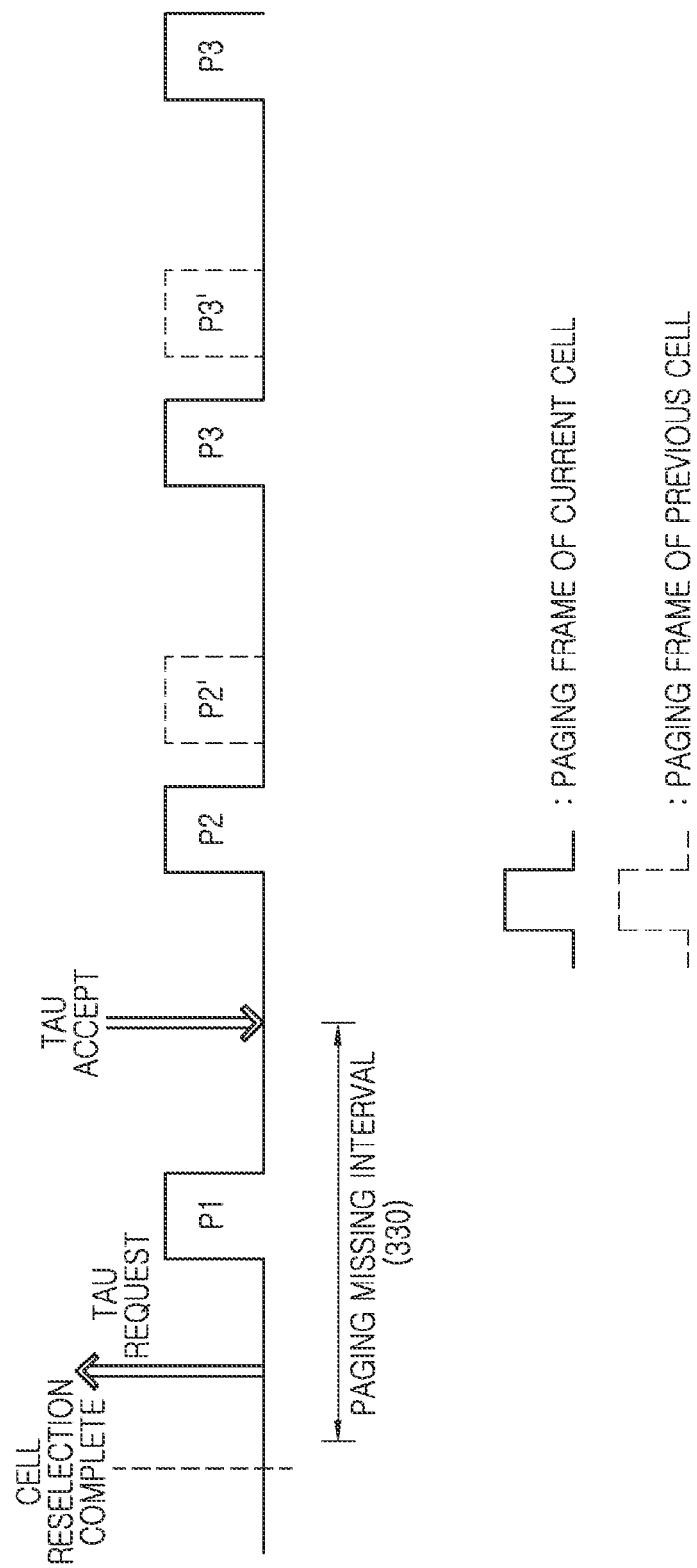
FIG. 3 illustrates an example of a Paging Frame (PF) distribution of a previous cell and a current cell according to an embodiment of the present disclosure.

FIG. 3 illustrates an example of a Paging Frame (PF) distribution of a previous cell and a current cell according to an embodiment of the present disclosure.

Referring to FIG. 3, a UE completes a cell reselection, transmits a TAU request to a BS in the current cell, and receives a TAU accept from the BS. Herein, the reselection may refer to a state of being accessible to the current cell by receiving system information on the current cell. In this case, in the middle of the transmitting of the TAU request and the receiving of the TAU accept, a paging starts at a PF P1 of the previous cell. That is, an interval from a time of completing the cell reselection to a time of receiving the TAU accept is a paging missing interval 330.

In this case, the UE determines a paging location of the previous cell. For example, by using a number of at least one of a Paging Occasion (PO), a paging cycle, and a User Equipment IDentifier (UE_ID) included in Paging Control Channel (PCCH) information for determining a reception location of the paging, the UE can calculate a correct paging location by calculating the PF and the PO. That is, the UE can determine the reception location of the paging in the previous cell by using paging-related information used in the previous cell. In FIG. 3, the paging location of the previous cell is a frame P2' and a frame P3'. Therefore, the UE may perform the cell reselection again of the previous cell according to the paging location, and thereafter may attempt the paging reception in the previous cell.

In this case, if a PF configuration is different between the previous cell and the current cell, then the UE can attempt both the paging reception in the previous cell and the paging reception in the current cell. Therefore, the UE attempts the paging reception of the previous cell only during a specific time. A case of the different PF configuration is illustrated in FIG. 3. On the other hand, in case of the same PF configuration, since the UE may not attempt the paging reception in both of the previous cell and the current cell, the UE attempts the paging reception in the previous cell a pre-set number of times, i.e., N times, instead of attempting the paging reception in the current cell. The number of times N of attempting the paging reception may be defined according to a specific configuration of the network.

According to an embodiment of the present disclosure, the UE may attempt the paging reception in the previous cell by considering a paging pattern of the previous cell. For example, the paging pattern of the previous cell may be the same as illustrated in FIG. 4 described below.

Figure 4:
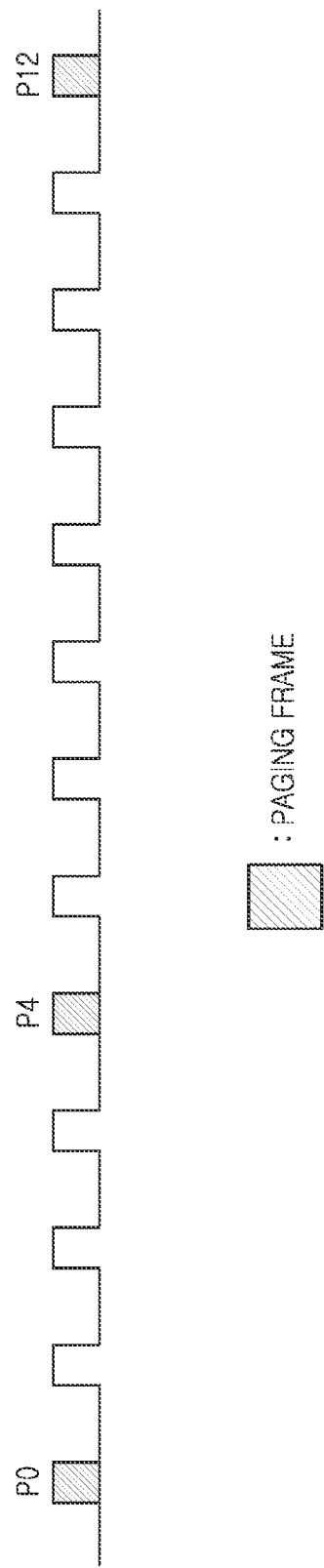
FIG. 4 illustrates an example of a paging pattern in a mobile communication system according to an embodiment of the present disclosure.

FIG. 4 illustrates an example of a paging pattern in a mobile communication system according to an embodiment of the present disclosure.

Referring to FIG. 4, if a paging is transmitted in frames P0, P4, and P12, as illustrated in FIG. 4, then the UE may recognize the paging pattern by using paging-related information received in a previous cell. In this case, the UE attempts a paging reception in the previous cell as illustrated in FIG. 5.

Figure 5:
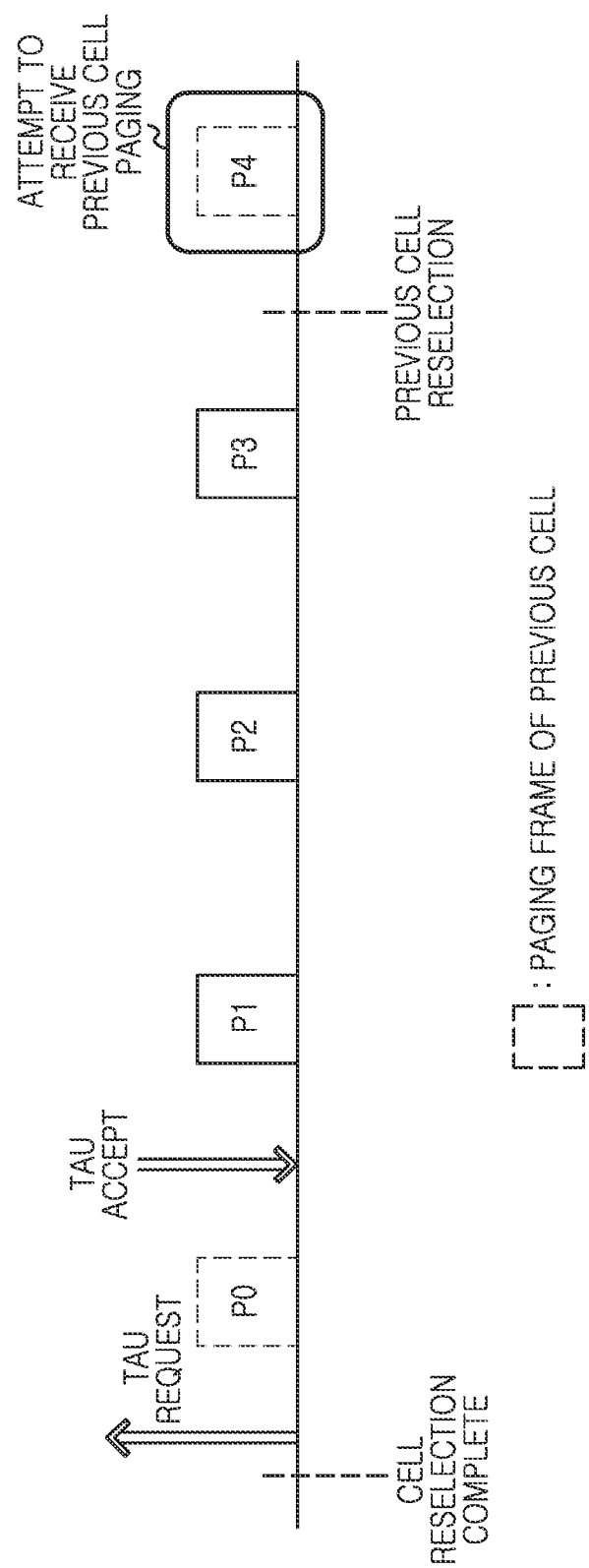
FIG. 5 illustrates a paging reception method in a previous cell when a Tracking Area (TA) is changed in a mobile communication system according to an embodiment of the present disclosure.

FIG. 5 illustrates a paging reception method in a previous cell when a TA is changed in a mobile communication system according to an embodiment of the present disclosure.

Referring to FIG. 5, a UE performs a cell reselection process, transmits a TAU request to a current cell, and receives a TAU accept. In this case, the UE assumes that a paging is transmitted in a frame P0 between a time of completing the cell reselection and a time of receiving the TAU accept, that is, during a paging missing interval. Accordingly, the UE performs the cell reselection of the previous cell in a frame P4, in which the paging in the previous cell is transmitted, and the UE attempts the paging reception in the previous cell. In general, the cell reselection includes a process of receiving system information of a corresponding cell. However, if the previous cell is reselected for the paging reception, then the UE may use previous cell's system information, or any other similar and/or suitable information, which is received before the cell reselection is achieved of the current cell, without having to again receive the system information of the previous cell.

If a result of attempting the paging reception shows that the paging is not received, then the UE performs, again, the cell reselection to the current cell. On the other hand, upon receiving the paging, the UE handles the paging. In other words, the UE releases an idle mode according to the paging, and performs communication. In this case, since the UE is located in a cell boundary area, the cell reselection may be achieved from the previous cell to the current cell.

According to another embodiment of the present disclosure, the UE may attempt the paging reception in the previous cell during a specific number of PFs after the completion of the TAU, that is, after receiving the TAU accept. In this case, it is not necessary for the UE to recognize the paging pattern in the previous cell. For example, the UE attempts the paging reception in the previous cell as illustrated in FIG. 6 below.

Figure 6:
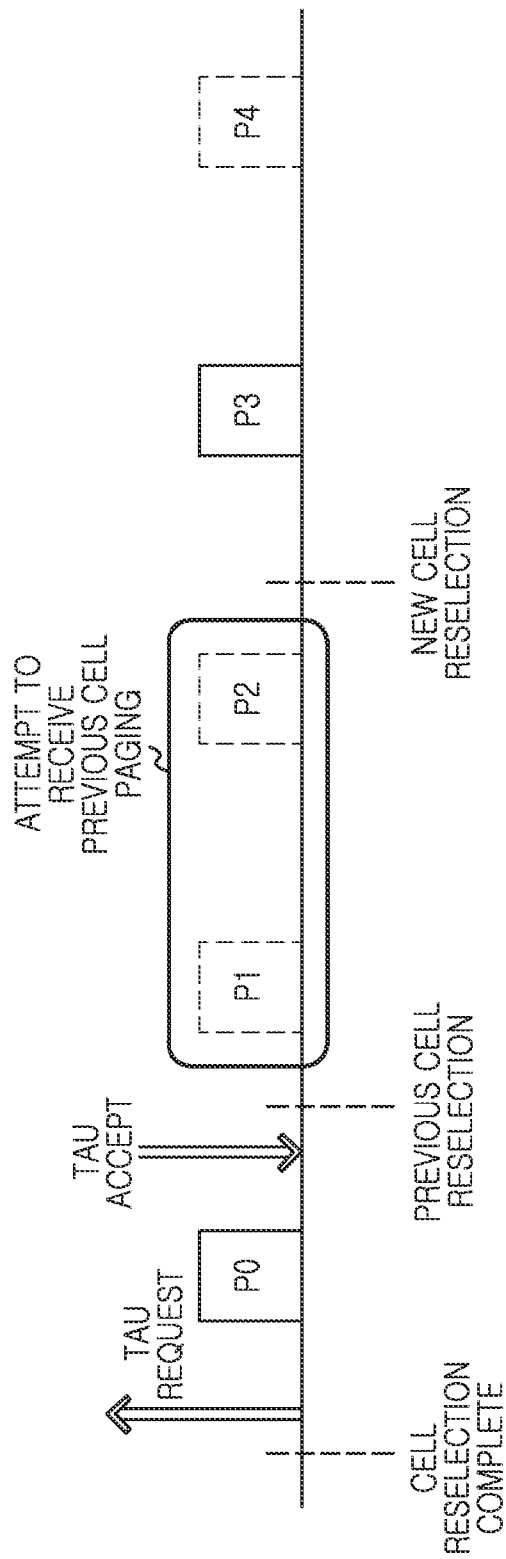
FIG. 6 illustrates a paging reception method in a previous cell when a TA is changed in a mobile communication system according to an embodiment of the present disclosure.

FIG. 6 illustrates a paging reception method in a previous cell when a TA is changed in a mobile communication system according to another embodiment of the present disclosure.

Referring to FIG. 6, a UE performs a cell reselection process, transmits a TAU request to a current cell, and receives a TAU accept. In this case, the UE assumes that a paging is transmitted in a frame P0 between a time of completing the cell reselection and a time of receiving the TAU accept, that is, during a paging missing interval. Accordingly, after the completion of the TAU process, the UE partially drops the paging reception in the current cell, attempts the cell reselection of the previous cell, and thereafter, attempts the paging reception in the previous cell. In general, the cell reselection includes a process of receiving system information of a corresponding cell. However, if the previous cell is reselected for the paging reception, then the UE may use the previous cell's system information, or any other similar and/or suitable information, which is received before the cell reselection is achieved of the current cell, without having to again receive the system information of the previous cell.

If a result of attempting the paging reception shows that the paging is not received, then the UE again performs the cell reselection of the current cell. On the other hand, upon receiving the paging, the UE handles the paging. In other words, the UE releases an idle mode according to the paging, and performs communication. In this case, since the UE is located in a cell boundary area, the cell reselection may be achieved from the previous cell to the current cell.

It is illustrated in FIG. 6 that the paging reception in the previous cell is attempted across two frames. However, a specific size of a paging reception attempt interval may be defined according to a specific configuration of a network. If a ping-pong phenomenon, wherein the UE is bounced back and forth between two BSs, occurs in a TA boundary area, then the embodiment of FIG. 6 may be more efficient.

A case corresponding to an RAT change is described below. A case where a UE performs a reselection from a second RAT to a first RAT will be described hereinafter. If the first RAT is based on LTE and the second RAT is based on UMTS, then the reselection may be called a UMTS to LTE (U2L) reselection. For example, if a Circuit Switch Fall Back (CSFB) function is executed or if the UE is located in a shadow area of an LTE signal, then the UE may temporarily access to the UMTS and thereafter may perform the RAT change to the LTE network.

Figure 7:
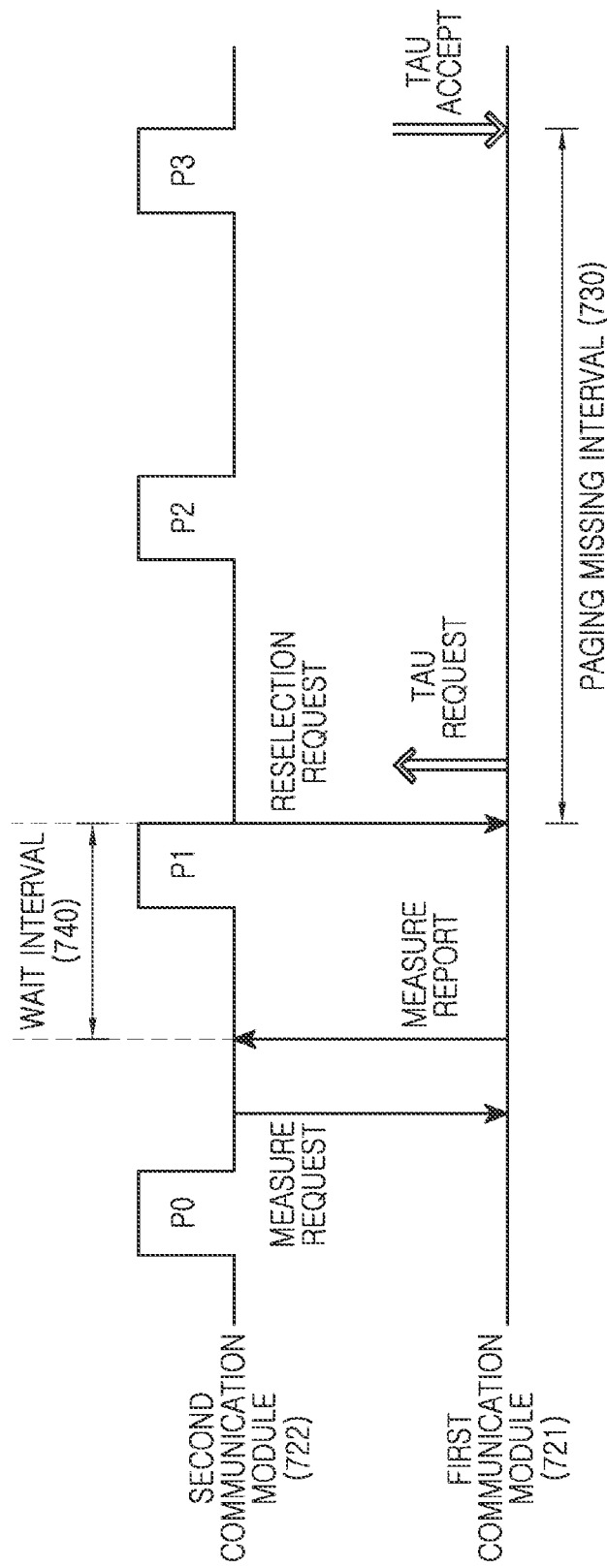
FIG. 7 illustrates a paging reception method in a previous cell when an RAT is changed in a mobile communication system according to an embodiment of the present disclosure.

According to an embodiment of the present disclosure, the UE may attempt to receive a paging by using a previous RAT as illustrated in FIG. 7 to be described below.

FIG. 7 illustrates a paging reception method in a previous cell when an RAT is changed in a mobile communication system according to an embodiment of the present disclosure.

Referring to FIG. 7, a second communication module 722 for a second RAT transmits a measure request to a first communication module 721 for a first RAT. Accordingly, the first communication module 721 performs a measurement for the first RAT, and sends a measure report to the second communication module 722. Herein, the measurement is for measuring quality of a signal transmitted in a cell of the first RAT. In this case, the first communication module 721 can immediately perform a reselection since the measure report is complete. However, even if the reselection can be performed, the first communication module 721 waits until the arrival of a PF P1, that is, a PF which first arrives in the first RAT. Accordingly, the second communication module 722 attempts a paging reception in the second RAT during a wait interval 740, in which the first communication module 721 is waiting. In FIG. 7, the wait interval 740 includes only one frame interval. However, a size of the wait interval 740 may be any suitable length and/or number of frame intervals defined differently according to a specific embodiment.

If a result of attempting the paging reception shows that the paging is received, then the UE handles the paging. In other words, the UE releases an idle mode in the second RAT according to the paging, and performs a communication process. For example, the communication process may include a voice call setup process or the like.

On the other hand, if the paging is not received, then the UE resumes an RAT change process, as described below. More specifically, the second communication module 722 transmits a reselection request to the first communication module 721, and the first communication module 721 performs the reselection and thereafter performs a TAU process. Although not shown in FIG. 7, the first communication module 721 may transmit a reselection confirm to the second communication module 722. That is, according to the embodiment illustrated in FIG. 7, the UE has at least one opportunity of attempting the paging reception in the previous RAT before a paging missing interval 730.

Figure 8:
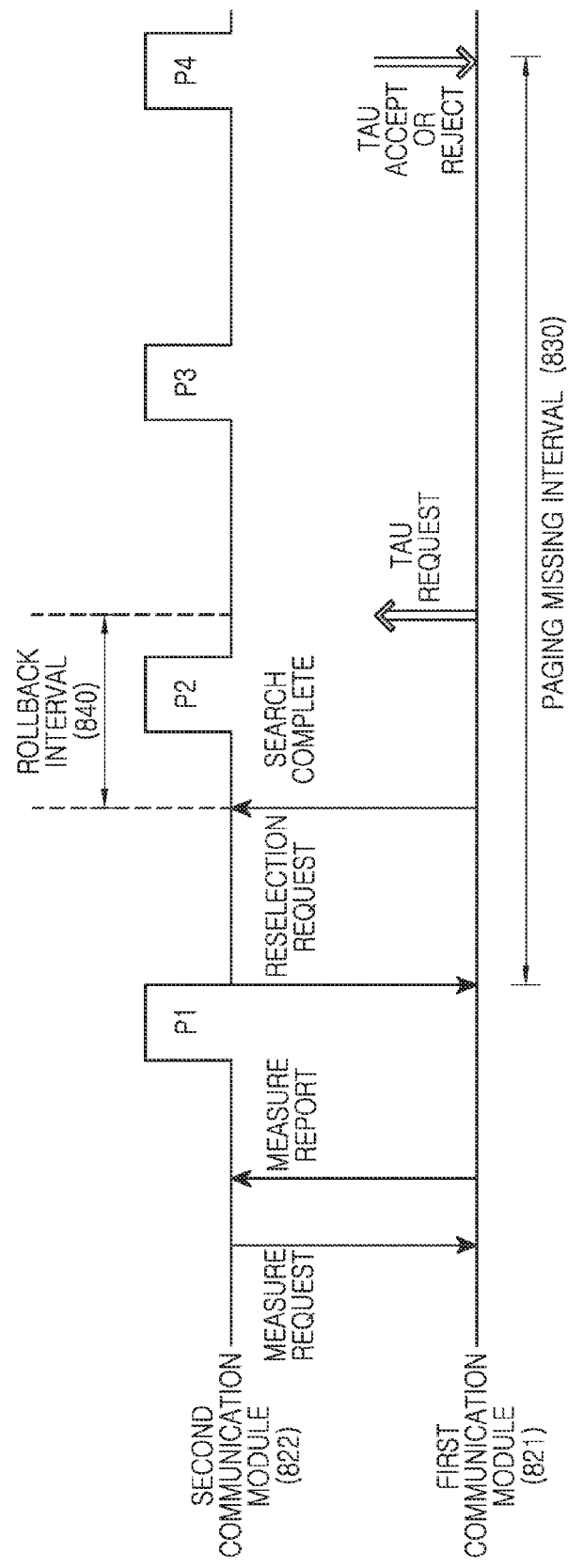
FIG. 8 illustrates a paging reception method in a previous cell before an RAT is changed in a mobile communication system according to another embodiment of the present disclosure.

According to another embodiment of the present disclosure, the UE may attempt the paging reception in the second RAT between a cell search process and a TAU process while performing a process of reselecting the first RAT as illustrated in FIG. 8.

FIG. 8 illustrates a paging reception method in a previous cell before an RAT is changed in a mobile communication system according to another embodiment of the present disclosure.

Referring to FIG. 8, a second communication module 822 for a second RAT transmits a measure request to a first communication module 821 for a first RAT. Accordingly, the first communication module 821 performs a measurement for the first RAT, and transmits a measure report to the second communication module 822. Subsequently, the second communication module 822 transmits a reselection request to the first communication module 821, and the first communication module 821 performs a reselection, and thereafter, notifies the second communication module 822 that a search is complete, that is, the first communication module 821 transmits a reselection confirm to the second communication module 822. In this case, the first communication module 821 waits, instead of immediately performing a TAU process. At the same time, a rollback to the second RAT is performed in order to activate the second communication module 822.

That is, after the search complete is notified, a rollback interval 840 is defined, and the second communication module 822 operates during the rollback interval 840. In this case, in order to decrease a time of performing a process for the rollback, instead of completely performing an RAT change process, e.g., a measurement process, a reselection process, or any other similar and/or suitable RAT change process, the second communication module 822 may partially omit the process by using, again, at least one of system information and synchronization information used previously when accessing to the second RAT. Therefore, during the rollback interval 840, the second communication module 822 attempts a paging reception in the second RAT. As illustrated in FIG. 8, the rollback interval 840 includes only one frame interval. However, a size of the rollback interval 840 may be defined differently according to a specific embodiment.

If a result of attempting the paging reception shows that the paging is received, then the UE handles the paging. In other words, the UE releases an idle mode according to the paging, and the UE then performs communication.

On the other hand, if the paging is not received, then the UE resumes an RAT change process, as described below. More specifically, the first communication module 821 completes the TAU process by transmitting a TAU request and by receiving a TAU accept or TAU reject. That is, according to the embodiment illustrated in FIG. 8, the UE has at least one opportunity of attempting the paging reception in the previous RAT in the middle of a paging missing interval 830.

Figure 9:
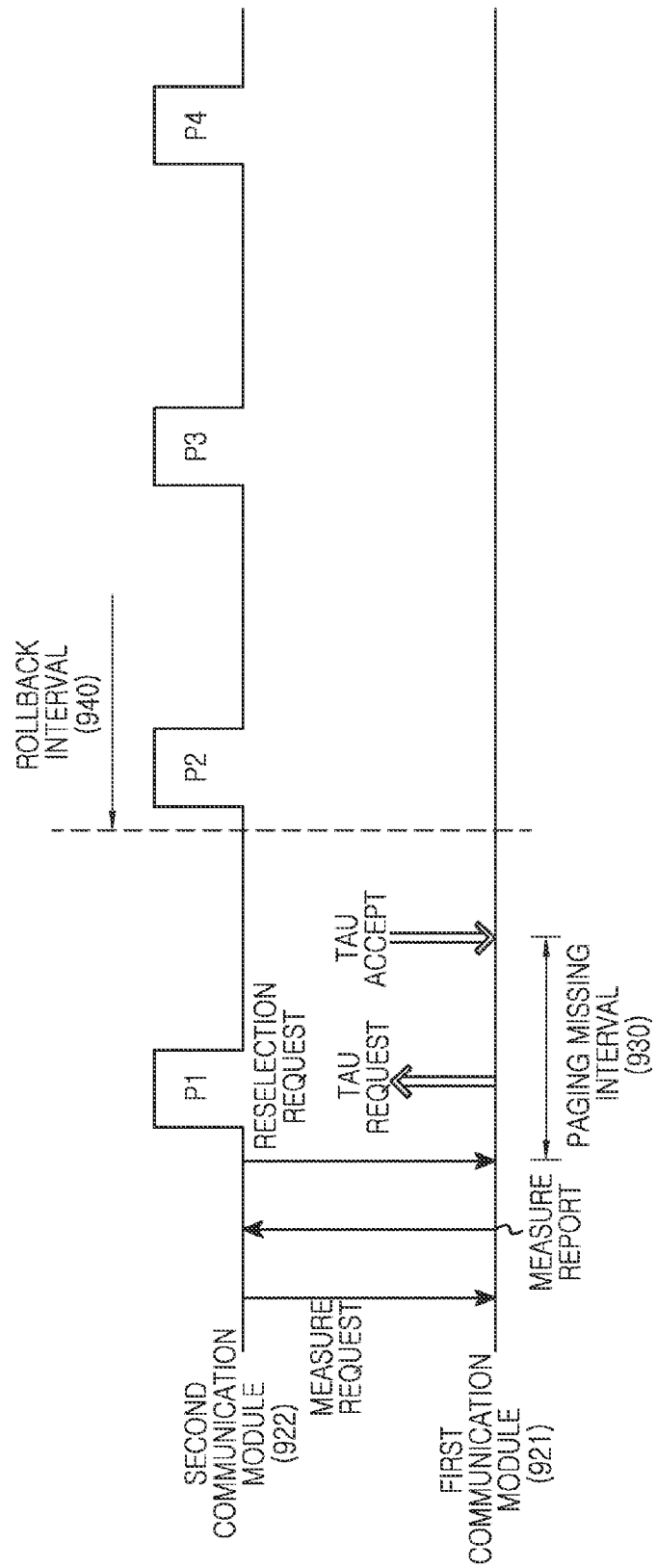
FIG. 9 illustrates a paging reception method in a previous cell before an RAT is changed in a mobile communication system according to an embodiment of the present disclosure.

According to another embodiment of the present disclosure, the UE may attempt the paging reception in the second RAT after completing the reselection process and the TAU process as illustrated in FIG. 9.

FIG. 9 illustrates a paging reception method in a previous cell before an RAT is changed in a mobile communication system according to another embodiment of the present disclosure.

Referring to FIG. 9, a second communication module 922 for a second RAT transmits a measure request to a first communication module 921 for a first RAT. Accordingly, the first communication module 921 performs a measurement for the first RAT, and transmits a measure report to the second communication module 922. Subsequently, the second communication module 922 transmits a reselection request to the first communication module 921, and the first communication module 921 performs a reselection and thereafter notifies the second communication module 922 that a search is complete, that is, the first communication module 921 transmits a reselection confirm to the second communication module 922. Subsequently, the first communication module 921 completes the TAU process by transmitting a TAU request and by receiving a TAU accept or TAU reject. Additionally, a paging missing interval 930 is illustrated.

Thereafter, a rollback to the second RAT is performed in order to activate the second communication module 922. That is, after the completion of the TAU process, a rollback interval 940 is defined, and the second communication module 922 operates during the rollback interval 940. In this case, in order to decrease a time of performing a process for the rollback, instead of completely performing an RAT change process, the second communication module 922 may partially omit the process by using system information, or the like, used previously when accessing to the second RAT. Therefore, during the rollback interval 940, the second communication module 922 attempts a paging reception in the second RAT. In this case, a size of the rollback interval 940 may be defined differently according to a specific embodiment.

If a result of attempting the paging reception shows that the paging is received, then the UE handles the paging. In other words, the UE releases an idle mode according to the paging, and performs communication. On the other hand, if the paging is not received, then the UE accesses again to the first RAT. That is, the embodiment of FIG. 9 conforms to a similar method of the various embodiments caused by the TA change of FIG. 5 and FIG. 6.

Hereinafter, an operation and structure of a UE which receives a paging as described above will be described in greater detail with reference to the accompanying drawings.

Figure 10:
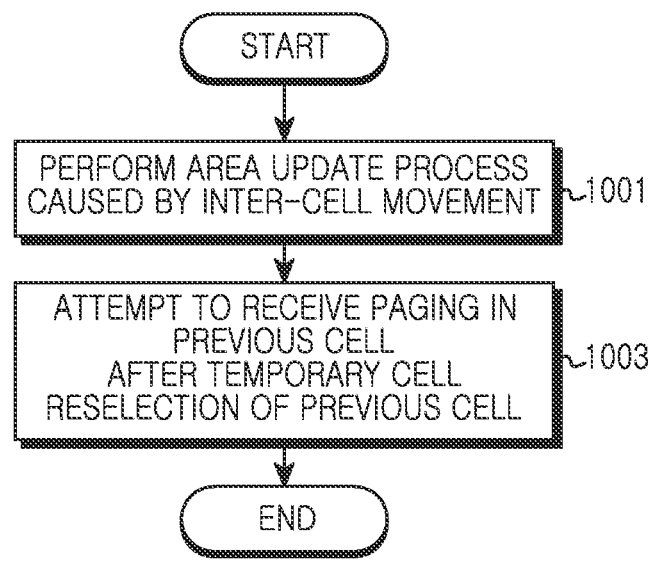
FIG. 10 is a flowchart illustrating a process of operating a User Equipment (UE) in a mobile communication system according to an embodiment of the present disclosure.

FIG. 10 is a flowchart illustrating a process of operating a UE in a mobile communication system according to an embodiment of the present disclosure.

Referring to FIG. 10, the embodiment of FIG. 10 is for a case where a TAU or an LAU is performed due to a TA or LA change. As illustrated in FIG. 10, a UE performs an area update process caused by an inter-cell movement in operation 1001. The area update process may refer to a process of updating a registration for an area in which the UE is located. For example, the area update process may be either one of the TAU and the LAU. More specifically, when entering an area not included in an area list, e.g., a TA list and/or an LA list, owned by the UE, the UE performs a cell reselection process, transmits a request message for the area update, and receives a response message for indicating an accept or a reject. Herein, the cell reselection includes a process of acquiring synchronization for a new cell and receiving system information. In this case, a paging transmitted in a previous cell may be missed during the area update process.

In operation 1003, the UE performs a temporary cell reselection of the previous cell, and thereafter attempts a paging reception in the previous cell. According to an embodiment of the present disclosure, the UE can perform the temporary cell reselection at a time of performing the paging in the previous cell, by considering a paging pattern of the previous cell. For this, the UE determines the paging pattern of the previous cell by using paging-related information received while accessing to the previous cell. According to another embodiment of the present disclosure, the UE may perform the temporary cell reselection during a pre-set specific interval without considering the paging pattern of the previous cell. For example, the UE attempts the paging reception in the previous cell during a pre-set number of frames immediately after the area update process. When attempting the paging reception in the previous cell, if the previous cell has the same frame configuration as a current cell, then the UE may partially drop the paging reception of the current cell.

Figure 11:
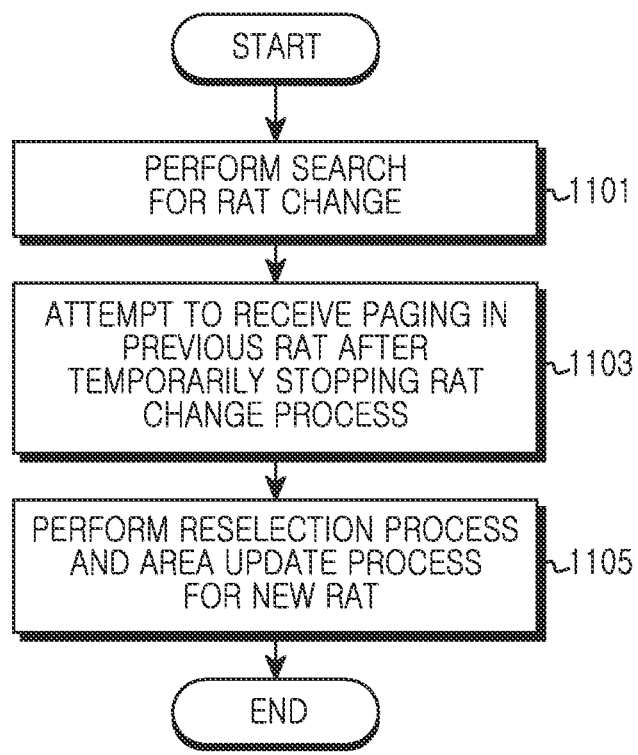
FIG. 11 is a flowchart illustrating a process of operating a UE in a mobile communication system according to an embodiment of the present disclosure.

FIG. 11 is a flowchart illustrating a process of operating a UE in a mobile communication system according to an embodiment of the present disclosure.

Referring to FIG. 11, the embodiment of FIG. 11 is for a case where a TAU or an LAU is performed due to an RAT change. As shown in FIG. 11, the UE performs a search process to change the RAT in operation 1101. That is, the UE determines whether a new RAT can be used in order to start an RAT change process.

After the new RAT is found, proceeding to operation 1103, the UE temporarily stops the RAT change process, and thereafter attempts a paging reception in the previous RAT. That is, before ending the access of the previous RAT and accessing the new RAT, the UE attempts the paging reception in the previous RAT. In this case, a resume time of the temporarily stopped process may be defined differently according to a specific embodiment. For example, the resume time may be defined as a time when N PFs elapse in the previous RAT, wherein N may be defined as 1, or the resume time may be any suitable and/or similar time or number of PFs.

In operation 1105, the UE performs a reselection process and an area update process with respect to the new RAT. Herein, the cell reselection includes a process of acquiring synchronization for a new cell and receiving system information. The area update process implies a process of updating a registration for an area in which the UE is located. For example, the area update process may be any one of the TAU and the LAU.

Figure 12:
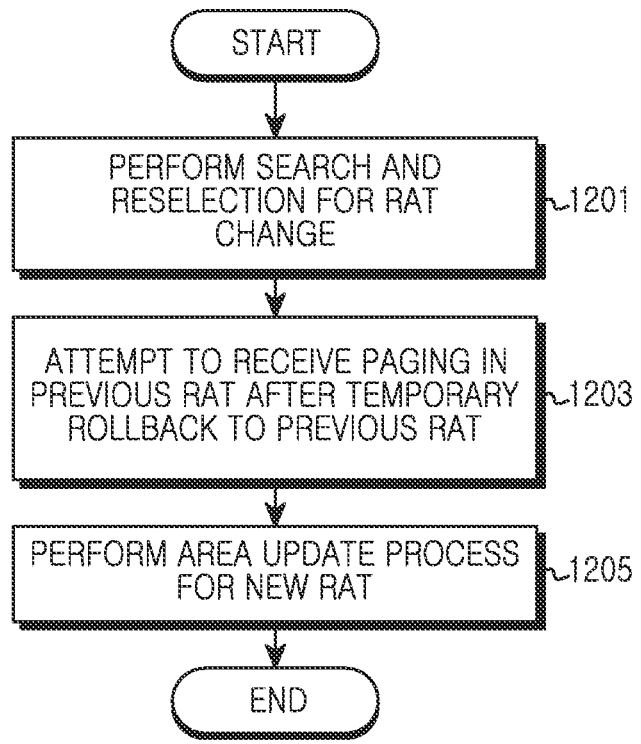
FIG. 12 is a flowchart illustrating a process of operating a UE in a mobile communication system according to an embodiment of the present disclosure.

FIG. 12 is a flowchart illustrating a process of operating a UE in a mobile communication system according to another embodiment of the present disclosure.

Referring to FIG. 12, the embodiment of FIG. 12 is for a case where a TAU or an LAU is performed due to an RAT change. A FIG. 12, a UE performs a search process and a reselection process to change the RAT in operation 1201. That is, the UE determines whether a new RAT can be used. That is, the UE starts an RAT change process, and then, the UE acquires synchronization for a cell of the new RAT, and receives system information.

In operation 1203, the UE performs a temporary rollback to the previous RAT, and attempts the paging reception in the previous RAT. In this case, in order to decrease a time of performing the rollback process, the UE may omit some operations of a typical RAT change process, such as a measure process, a reselection process, or any other similar and/or suitable process that may be omitted. The operations of the RAT change process may be omitted by using system information, or the like, that is used when accessing to the previous RAT. In this case, an end time of the temporary rollback may be defined differently according to a specific embodiment. For example, the end time may be defined as a time when N PFs elapse in the previous RAT. For example, N may be defined as 1, or the end time may be any suitable and/or similar time or number of PFs.

After the temporary rollback ends, proceeding to operation 1205, the UE performs an area update process for the new RAT. The area update process may refer to a process of updating a registration for an area in which the UE is located. For example, the area update process may be any one of the TAU and the LAU.

Figure 13:
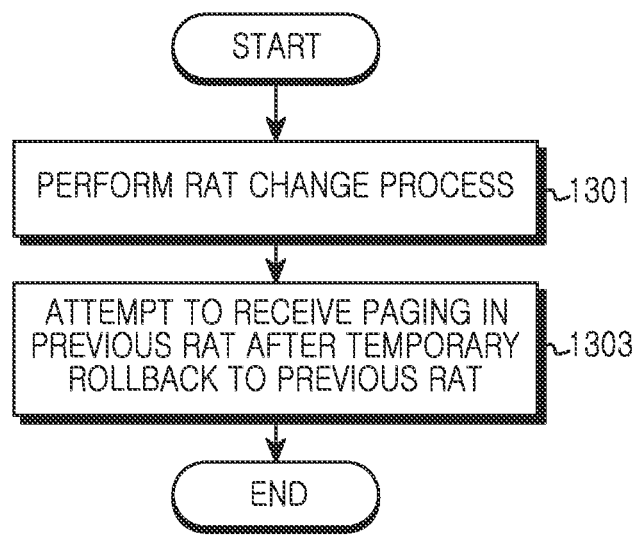
FIG. 13 is a flowchart illustrating a process of operating a UE in a mobile communication system according to an embodiment of the present disclosure.

FIG. 13 is a flowchart illustrating a process of operating a UE in a mobile communication system according to another embodiment of the present disclosure. The embodiment of FIG. 13 is for a case where a TAU or an LAU is performed due to an RAT change.

Referring to FIG. 13, the UE performs an RAT change process in operation 1301. That is, the UE performs a search process, a reselection process, and an area update process to change the RAT. That is, the UE determines whether a new RAT can be used, and then the UE starts an RAT change process. Then, the UE acquires synchronization for a cell of the new RAT, and receives system information. The area update process may refer to a process of updating a regis-tration for an area in which the UE is located. For example, the area update process may be any one of the TAU and the LAU.

In operation 1303, the UE performs a temporary rollback to the previous RAT, and attempts the paging reception in the previous RAT. In this case, in order to decrease a time of performing the rollback process, the UE may omit some operations of a typical RAT change process, e.g., a measure process, a reselection process, or any other similar and/or suitable process that may be omitted. The operations of the RAT change process may be omitted by using system information, or the like, used when accessing to the previous RAT. In this case, an end time of the temporary rollback may be defined differently according to a specific embodiment. For example, the end time may be defined as a time when N PFs elapse in the previous RAT. For example, N may be defined as 1, or the end time may be any suitable and/or similar time or number of PFs.

Although not shown in FIG. 13, if a result of attempting the paging reception in the previous RAT shows that the paging does not occur, then the UE restores the access to the new RAT.

In the various embodiments described with reference to FIG. 10 to FIG. 13, the present disclosure describes an area update by classifying and/or determining the area update to be at least one of an area update caused by an RAT change and an area update caused by an inter-cell movement. However, both of the area update caused by the RAT change and the area update caused by the inter-cell movement can be collectively called an area update caused by a 'registration area' change. That is, regardless of whether the area update process is caused by the RAT change or the inter-cell movement, a UE performs the area update process caused by the registration area change.

Figure 14:
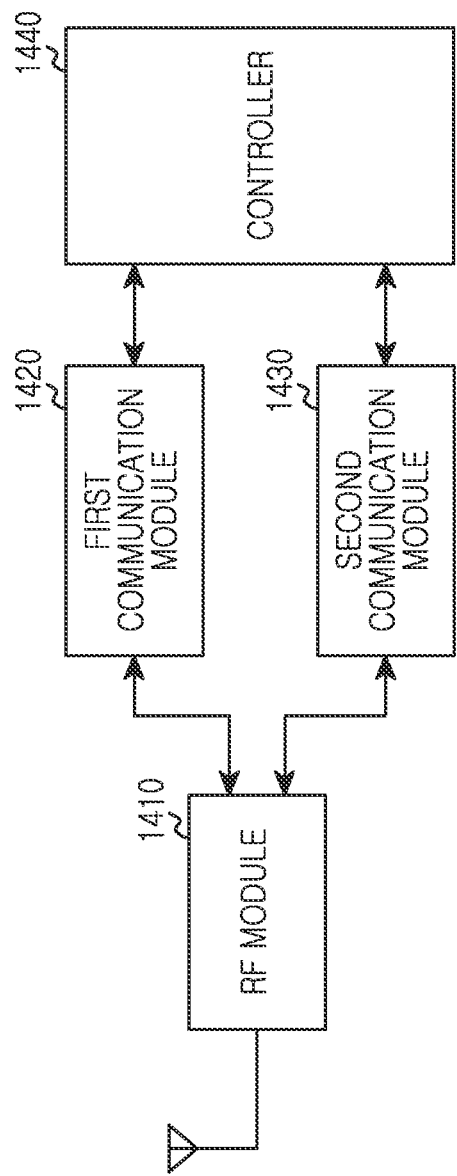
FIG. 14 is a block diagram illustrating a structure of a UE in a mobile communication system according to an embodiment of the present disclosure.

FIG. 14 is a block diagram illustrating a structure of a UE in a mobile communication system according to an embodiment of the present disclosure.

Referring to FIG. 14, the UE includes a Radio Frequency (RF) module 1410, a first communication module 1420, a second communication module 1430, and a controller 1440. The RF module 1410 performs a function for transmitting and/or receiving a signal through a wireless channel by performing signal band conversion, amplification, and other similar and/or suitable operations for transmitting and/or receiving signals. That is, the RF module 1410 up-converts a baseband signal provided from the first communication module 1420 and the second communication module 1430 into an RF signal, and then transmits the RF signal through an antenna, and also down-converts an RF signal received through the antenna into a baseband signal. For example, the RF module 1410 may include, although not shown in FIG. 14, an amplifier, a mixer, an oscillator, a Digital to Analog Converter (DAC), an Analog to Digital Converter (ADC), and other similar and/or suitable elements for transmitting and receiving signals. Although only one antenna is illustrated in FIG. 14, a plurality of antennas may be connected to the RF module 1410. In addition, although one RF module 1410 is illustrated in FIG. 14, at least one RF module may be further included in the UE of FIG. 14.

The first communication module 1420 and the second communication module 1430 perform a conversion function between a baseband signal and a bit-stream according to a supported communication standard. For example, if the first communication module 1420 conforms to an Orthogonal Frequency Division Multiplexing (OFDM) scheme, then, in a data transmission process, the first communication module 1420 generates complex symbols by performing coding and modulation on a transmitted bit-stream, maps the complex symbols to subcarriers, and then configures OFDM symbols by performing an Inverse Fast Fourier Transform (IFFT) operation and a Cyclic Prefix (CP) insertion operation. In addition, in a data reception process, the first communication module 1420 splits the baseband signal provided from the RF module 1410 on an OFDM symbol basis, restores signals mapped to the subcarriers by using a Fast Fourier Transform (FFT) operation, and then restores a received bit-stream by performing demodulation and decoding. For example, the first communication module 1420 may support a 4G standard, such as LTE, and the second communication module 1430 may support a 3G standard, such as UMTS.

The controller 1440 provides an overall control to the UE. For example, the controller 1440 transmits and receives a signal via the first communication module 1420, the second communication module 1430, and the RF module 1410. In addition, in a case of accessing to a first RAT supported by the first communication module 1420, the controller 1440 may determine whether to change the RAT on the basis of signal quality for the first RAT, as measured by the first communication module 1420. If it is determined to change the RAT, then the controller 1440 may perform the procedure shown in the related art of FIG. 1 by controlling the first communication module 1420 and the second communication module 1430.

In particular, according to an embodiment of the present disclosure, the controller 1440 performs a function for avoiding paging missing during a TAU/LAU process, wherein the function is performed due to a TA/LA change or an RAT change. For example, if a registration area to which the UE belongs is changed, then the controller 1440 controls the first communication module 1420 and the second communication module 1430 to perform the procedures of FIG. 10 to FIG. 13. An operation of the controller 1440, according to the embodiment of the present disclosure, is as follows.

An embodiment of a case where the TAU or the LAU is performed due to the TA or LA change is described below. The controller 1440 performs an area update process caused by an inter-cell movement. The area update process implies a process of updating a registration for an area in which the UE is located. Thereafter, the controller 1440 attempts a paging reception in the previous cell after performing a temporary cell reselection of the previous cell. According to the embodiment of the present disclosure, the controller 1440 may perform the temporary cell reselection at a time of performing the paging in the previous cell. According to another embodiment of the present disclosure, the controller 1440 may perform the temporary cell reselection during a pre-set specific interval.

An embodiment corresponding to the case of performing the TAU or the LAU due to the RAT change is as follows. A case of changeing the RAT from a second RAT, supported by the second communication module 1430, to a first RAT, supported by the first communication module 1420, is taken as an example in the present disclosure described below. The controller 1440 controls the first communication module 1420 to perform a search process to change the RAT. In addition, if the new RAT is found, then the controller 1440 temporarily stops the RAT change process, and thereafter attempts the paging reception in the previous RAT. That is, the controller 1440 temporarily stops an operation of the first communication module 1420, and activates the second communication module 1430 so that the second communication module 1430 attempts the paging reception. Thereafter, the controller 1440 finishes the temporary stopping according to a pre-defined rule, and controls the first communication module 1420 to perform a reselection process and an area update process with respect to the first RAT.

Another embodiment of the case of performing the TAU or the LAU due to the RAT change is as follows. A case of changeing the RAT from a second RAT, supported by the second communication module 1430, to a first RAT, supported by the first communication module 1420, is taken as an example in the present disclosure, as described below. The controller 1440 controls the first communication module 1420 to perform a search process and a reselection process to change the RAT. Thereafter, the controller 1440 stops an operation of the first communication module 1420, and controls the second communication module 1430 to perform a temporary rollback to the previous RAT. In addition, the controller 1440 attempts the paging reception in the previous RAT via the first communication module 1430. In this case, in order to decrease a time of performing the rollback process, the second communication module 1430 may omit some operations of a typical RAT change process, e.g. a measure process, a reselection process, or any other similar and/or suitable process that may be omitted. After the temporary rollback ends, the controller 1440 performs an area update process for the first RAT.

Another embodiment of the case of performing the TAU or the LAU due to the RAT change is as follows. A case of changeing the RAT from a second RAT, supported by the second communication module 1430, to a first RAT, supported by the first communication module 1420, is taken as an example in the present disclosure described below. The controller 1440 controls the first communication module 1420 to perform a search process, a reselection process, and an area update process to change the RAT. Thereafter, the controller 1440 controls the second communication module 130 to perform a temporary rollback to the previous RAT and to attempt the paging reception in the previous RAT. In this case, in order to decrease a time of performing the rollback process, the UE may omit some operations of a typical RAT change process, e.g. a measure process, a reselection process, or any other similar and/or suitable process that may be omitted. The operations of the RAT change process may be omitted by using system information, or the like, used when accessing to the previous RAT.

The present disclosure may avoid missing of a paging which starts in a previous cell or a previous Radio Access Technology (RAT), caused by a Location Area Update (LAU) or Tracking Area Update (TAU) process after an inter-cell movement or an RAT change in a mobile communication system.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating a user equipment (UE) in a mobile communication system, the method comprising:
   transmitting, to a base station (BS), a request for an area update in response to a change from a previous registration area to a current registration area;
   receiving, from the BS, a response for accepting the request for the area update; and
   performing a cell reselection to the previous registration area from the current registration area for receiving a paging transmitted on the previous registration area; and
   changing, if the paging is received on the previous registration area, an operation mode from an idle mode to an active mode.

2. The method of claim 1, wherein the performing of the cell reselection comprises:
   determining at least one frame in which a paging transmitted on the previous registration area is received; and
   performing the cell reselection to the previous registration area for receiving the paging based on the at least one frame.

3. The method of claim 2, wherein the at least one frame is determined based on at least one of a number of paging occasions (PO), a paging cycle, and an identifier of the UE.

4. The method of claim 1, further comprising:
   performing a handover from the previous registration area to the current registration area.

5. The method of claim 1, further comprising:
   performing, if the paging is not received on the previous registration area, another cell reselection to the current registration area from the previous registration area;
   receiving a paging on the current registration area; and
   changing an operation mode from the idle mode to the active mode according to the paging.

6. The method of claim 1, wherein the change is caused by at least one of a movement between cells and a change of radio access technology (RAT).

7. A method for operating a user equipment (UE) in a mobile communication system, the method comprising:
   determining a quality of signal associated with a first radio access technology (RAT) in order to change a RAT from a second RAT to the first RAT;
   performing a reselection for the first RAT;
   performing a rollback to the second RAT for receiving a paging transmitted on the second RAT; and
   changing, if the paging is received on the second RAT, an operation mode from an idle mode to an active mode.

8. The method of claim 7, further comprising:
   transmitting, to a base station (BS), a request for an area update on the first RAT; and
   receiving, from the BS, a response for accepting the request for the area update.

9. The method of claim 8, wherein the performing of the reselection for the first RAT comprises:
   determining at least one frame in which a paging is received on the second RAT; and
   performing the reselection for the first RAT after an interval of the at least one frame.

10. The method of claim 7, further comprising:
    performing, if the paging is not received on the second RAT, another reselection to the first RAT from the second RAT;
    receiving the paging on the first RAT; and
    changing an operation mode from the idle mode to the active mode according to the paging received on the first RAT.

11. The method of claim 10, further comprising:
    obtaining system information for the second RAT,
    wherein the performing the rollback comprises performing the rollback by using the system information.

12. An apparatus of a user equipment (UE) in a mobile communication system, the apparatus comprising:
    at least one transceiver; and
    a controller operatively coupled to the at least one transceiver,
    wherein the controller is configured to:
      transmit, to a base station (BS), a request for an area update in response to a change from a previous registration area to a current registration area,
      receive, from the BS, a response for accepting the request for the area update,
      perform a cell reselection to the previous registration area from the current registration area for receiving a paging transmitted on the previous registration area; and
      change, if the paging is received on the previous registration area, an operation mode from an idle mode to an active mode.

13. The apparatus of claim 12, wherein the controller, in order to perform the cell reselection, is further configured to:
    determine at least one frame in which a paging transmitted on the previous registration area is received, and
    perform the cell reselection to the previous registration area for receiving the paging based on the at least one frame.

14. The apparatus of claim 13, wherein the at least one frame is determined based on at least one of a number of paging occasions (PO), a paging cycle, and an identifier of the UE.

15. The apparatus of claim 12, wherein the controller is further configured to:
    perform a handover from the previous registration area to the current registration area.

16. The apparatus of claim 12, wherein the controller is further configured to:
    perform, if the paging is not received on the previous registration area, another cell reselection to the current registration area from the previous registration area;
    receive a paging on the current registration area; and
    change an operation mode from the idle mode to the active mode according to the paging.

17. The apparatus of claim 12, wherein the change is caused by at least one of a movement between cells and a change of radio access technology (RAT).

18. An apparatus of a user equipment (UE) in a mobile communication system, the apparatus comprising:
   at least one transceiver; and
   a controller operatively coupled to the at least one transceiver,
   wherein the controller is configured to:
      determine a quality of a signal associated with a first radio access technology (RAT) in order to change a RAT from a second RAT to the first RAT,
      perform a reselection for the first RAT,
      perform a rollback to the second RAT for receiving a paging transmitted on the second RAT, and
      change, if the paging is received on the second RAT, an operation mode from an idle mode to an active mode.

19. The apparatus of claim 18, wherein the controller is further configured to:
   transmit, to a base station (BS), a request for an area update on the first RAT, and
   receive, from the BS, a response for accepting the request for the area update.

20. The apparatus of claim 19, wherein the controller is further configured to:
   determine at least one frame in which a paging is received on the second RAT, and
   perform the reselection for the first RAT after an interval of the at least one frame.

21. The apparatus of claim 18, wherein the controller is further configured to:
   perform, if the paging is not received on the second RAT, another reselection to the first RAT from the second RAT;
   receive the paging on the first RAT; and
   change an operation mode from the idle mode to the active mode according to the paging received on the first RAT.

22. The apparatus of claim 21, wherein the controller is further configured to:
   obtain system information for the second RAT, and
   perform the rollback by using the system information.

* * * * *